United States Patent
Yen et al.

(10) Patent No.: US 12,482,878 B2
(45) Date of Patent: Nov. 25, 2025

(54) DIELECTRIC LIQUID EVAPORATIVE COOLING FOR BATTERY PACKS

(71) Applicant: GM GLOBAL TECHNOLOGY OPERATIONS LLC, Detroit, MI (US)

(72) Inventors: Chih-hung Yen, Bloomfield Hills, MI (US); Taeyoung Han, Bloomfield Hills, MI (US); Bahram Khalighi, Auburn Hills, MI (US); Kuo-huey Chen, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1048 days.

(21) Appl. No.: 17/519,762

(22) Filed: Nov. 5, 2021

(65) Prior Publication Data

US 2023/0143123 A1   May 11, 2023

(51) Int. Cl.
  *H01M 10/6556* (2014.01)
  *H01M 10/613* (2014.01)
  *H01M 10/6569* (2014.01)
(52) U.S. Cl.
  CPC ..... *H01M 10/6556* (2015.04); *H01M 10/613* (2015.04); *H01M 10/6569* (2015.04)
(58) Field of Classification Search
  CPC .......... H01M 10/6556; H01M 10/613; H01M 10/6569
  See application file for complete search history.

(56) References Cited

U.S. PATENT DOCUMENTS

| | | | | |
|---|---|---|---|---|
| 11,114,713 | B2* | 9/2021 | Sunada | H01M 10/04 |
| 2008/0124622 | A1* | 5/2008 | Hamada | H01M 50/293 |
| | | | | 429/149 |
| 2010/0266883 | A1* | 10/2010 | Koetting | H01M 10/6551 |
| | | | | 429/96 |
| 2013/0108897 | A1* | 5/2013 | Christian | H01M 10/647 |
| | | | | 429/50 |
| 2015/0280295 | A1* | 10/2015 | Bhunia | F28D 15/046 |
| | | | | 429/50 |
| 2018/0034116 | A1* | 2/2018 | Tajima | H01M 10/6569 |
| 2019/0331432 | A1* | 10/2019 | Tseng | B33Y 10/00 |
| 2019/0393576 | A1* | 12/2019 | Sunada | H01M 10/6554 |
| 2020/0136216 | A1* | 4/2020 | Dede | H01M 10/659 |
| 2021/0020975 | A1* | 1/2021 | Seymour | C25B 15/02 |

FOREIGN PATENT DOCUMENTS

| | | | | |
|---|---|---|---|---|
| CN | 110165118 B | * | 12/2019 | B60K 1/04 |
| FR | 2989232 A1 | * | 10/2013 | H01R 13/6683 |

OTHER PUBLICATIONS

Office Action dated May 12, 2023 from German Patent Office for German Patent Application No. 102022123393.6; 4 pages.

* cited by examiner

*Primary Examiner* — Alexander Usyatinsky

(57) ABSTRACT

A wicking assembly for battery cells of a battery cooling system includes a first face plate including vertical plate portions and horizontal plate portions defining openings. A second face plate includes vertical plate portions and horizontal plate portions defining openings. A wicking structure is made of a wicking material, defines projections on first and second outer surfaces thereof and includes a plurality of vapor escape passages. The wicking structure is configured to be sandwiched between the first face plate and the second face plate.

20 Claims, 3 Drawing Sheets

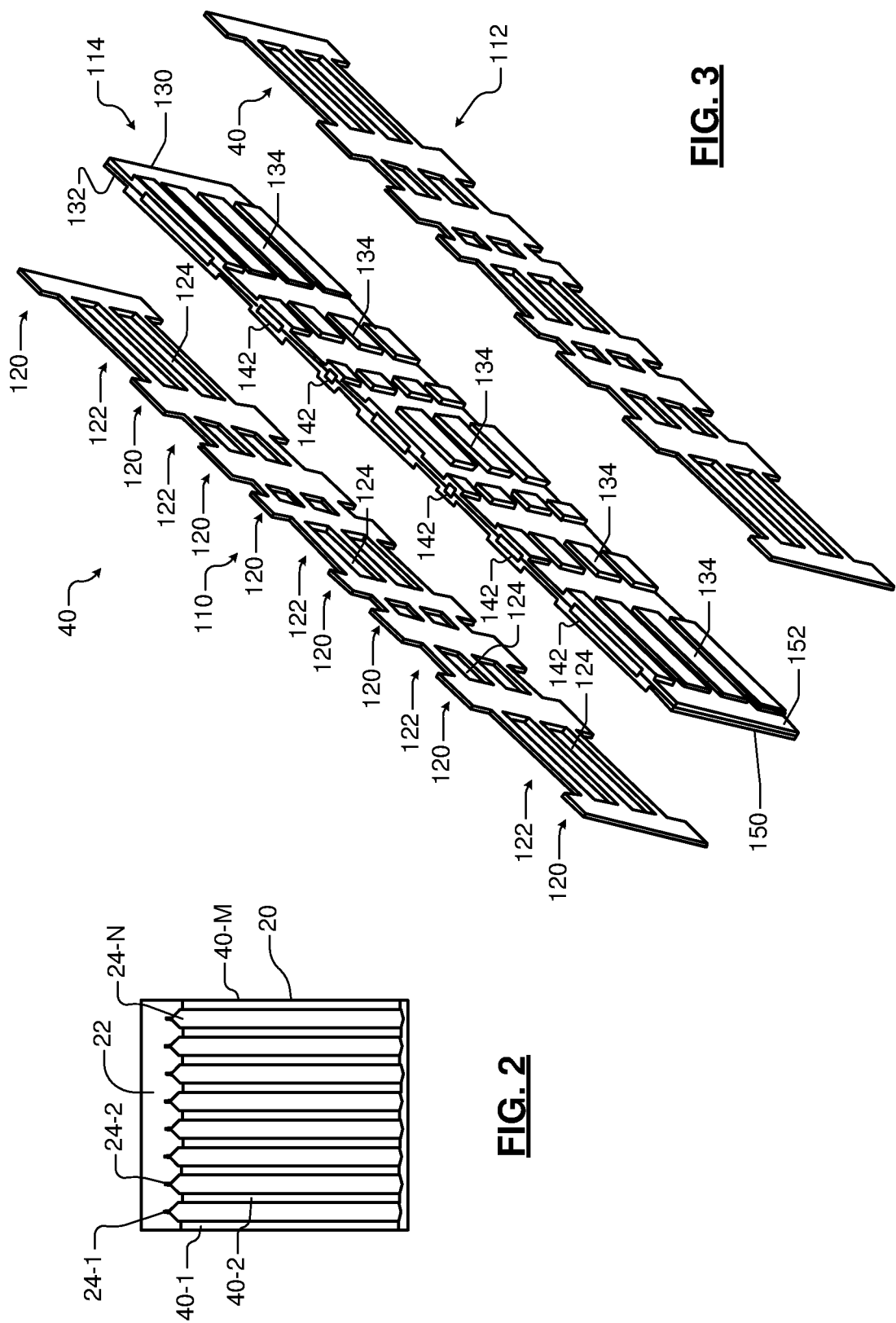

DIELECTRIC LIQUID EVAPORATIVE COOLING FOR BATTERY PACKS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery cooling systems, and more particularly to battery cooling systems for BEVs.

Battery electric vehicles (BEVs) include a battery system including one or more battery packs with one or more battery modules. Each of the battery modules includes one or more battery cells. A power control system is used to control charging and/or discharging of the battery system during operation. During driving, one or more electric motors of the BEV receive power from the battery system to provide propulsion for the vehicle and/or to return power to the battery system during regenerative braking.

During operation of the BEV, the battery cells may experience heating due to charging and discharging. Battery life may be adversely impacted by operation for extended periods at higher temperatures. As a result, battery cooling systems may be used to maintain the temperature of the battery system within a predetermined temperature range. For example, a normal temperature range for a lithium ion battery may be in a range from 30° C. to 50° C.

SUMMARY

A wicking assembly for battery cells of a battery cooling system includes a first face plate including vertical plate portions and horizontal plate portions defining openings. A second face plate includes vertical plate portions and horizontal plate portions defining openings. A wicking structure is made of a wicking material, defines projections on first and second outer surfaces thereof and includes a plurality of vapor escape passages. The wicking structure is configured to be sandwiched between the first face plate and the second face plate.

In other features, the projections on the first and second outer surfaces of the wicking structure are received in the openings of the first face plate and the second face plate, respectively. The projections on the first outer surface and the second outer surface are aligned vertically the plurality of vapor escape passages. The plurality of vapor escape passages extend in a vertical direction of the wicking structure. The wicking structure is selected from a group consisting of wire mesh and a porous material. The first and second face plates are made of a material selected from a group consisting of mica, garolite, and aerogel.

A battery cooling system comprises a battery enclosure, M of the wicking assembly of claim 1, wherein M is an integer greater than one and N battery cells, where N is an integer greater than one. Each of the M wicking assemblies is arranged between adjacent ones of the N battery cells.

In other features, vapor manifold is defined by the battery enclosure above the N battery cells. A condenser is in fluid communication with the vapor manifold. A pump includes an inlet in fluid communication with the condenser and an outlet in fluid communication with an inlet of the battery enclosure. A separator is arranged in fluid communication between the condenser and the pump. A heat exchanger is arranged above the vapor manifold of the battery enclosure.

A battery cooling system comprises a battery enclosure and M wicking assemblies, where M is an integer greater than one. Each of the M wicking assemblies includes a first face plate, a second face plate and a wicking structure arranged between the first face plate and the second face plate. The battery cooling system comprises N battery cells, where N is an integer greater than one. The N battery cells comprise pouch-type battery cells. Each of the M wicking assemblies is arranged between adjacent ones of the N battery cells in the battery enclosure.

In other features, the first face plate includes vertical plate portions and horizontal plate portions defining openings. The second face plate includes vertical plate portions and horizontal plate portions defining openings. The wicking structure is made of a wicking material, defines projections on first and second outer surfaces thereof and includes a plurality of vapor escape passages. The projections on the first and second outer surfaces of the wicking structure are received in the openings of the first face plate and the second face plate, respectively. The projections on the first outer surface and the second outer surface are vertically aligned with the plurality of vapor escape passages.

In other features, the plurality of vapor escape passages extend in a vertical direction of the wicking structure. The wicking structure is selected from a group consisting of wire mesh and a porous material. The first face plate and the second face plate are made of a material selected from a group consisting of mica, garolite, and aerogel.

In other features, a vapor manifold defined by the battery enclosure above the N battery cells. A condenser is in fluid communication with the vapor manifold. A pump includes an inlet in fluid communication with the condenser and an outlet in fluid communication with an inlet of the battery enclosure.

In other features, a separator is arranged in fluid communication between the condenser and the pump. A heat exchanger is arranged above the vapor manifold of the battery enclosure.

A battery cooling system comprises a battery enclosure and N battery cells arranged in the battery enclosure and having a rigid outer surface, where N is an integer greater than one. Wicking material arranged on the rigid outer surface of the N battery cells. A vapor manifold is defined by the battery enclosure above the N battery cells. A condenser is in fluid communication with the vapor manifold. A pump includes an inlet in fluid communication with the condenser and an outlet in fluid communication with an inlet of the battery enclosure.

In other features, a separator is arranged in fluid communication between the condenser and the pump. A heat exchanger is arranged above the vapor manifold of the battery enclosure.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 is a side cross-sectional view illustrating an example of a battery enclosure, the battery cells and the wicking assemblies according to the present disclosure;

FIG. 3 is an exploded view of an example of one of the wicking assemblies including a wicking structure arranged between face plates according to the present disclosure;

In the drawings, reference numbers may be reused to identify similar and/or identical elements.

DETAILED DESCRIPTION

A battery cooling system according to the present disclosure uses evaporation of dielectric fluid to cool a battery system. While the foregoing disclosure will be described in the context of a battery electric vehicle (BEV) or hybrid vehicle, the battery cooling system can be used to cool battery systems in other applications.

The battery cooling system performs cooling by evaporating a small amount of dielectric fluid supplied to surfaces of battery cells. In other words, a smaller amount of dielectric fluid is used instead of substantially filling a battery enclosure with dielectric fluid. In some examples, the battery enclosure requires dielectric fluid to fill under 20% (and in some cases under 10%) of a height of the battery enclosure, although higher or lower levels of dielectric fluid can be used.

In various examples described further below, a wicking material is used to wick dielectric fluid located in a lower portion of the battery enclosure by capillary action upwardly to allow heat exchange with side surfaces of the battery cells. The dielectric fluid absorbs heat from the side surfaces of the battery cells causing evaporation of the dielectric fluid. The vapor rises, is collected in a vapor manifold, condensed and returned by a pump to the battery enclosure.

The cooling action provided by the battery cooling system regulates the temperature of the battery cells. The cooling system according to the present disclosure significantly reduces the amount of coolant required for cooling, which reduces the weight of the battery cooling system and reduces energy used for pumping and required pumping capacity.

Figure 1:
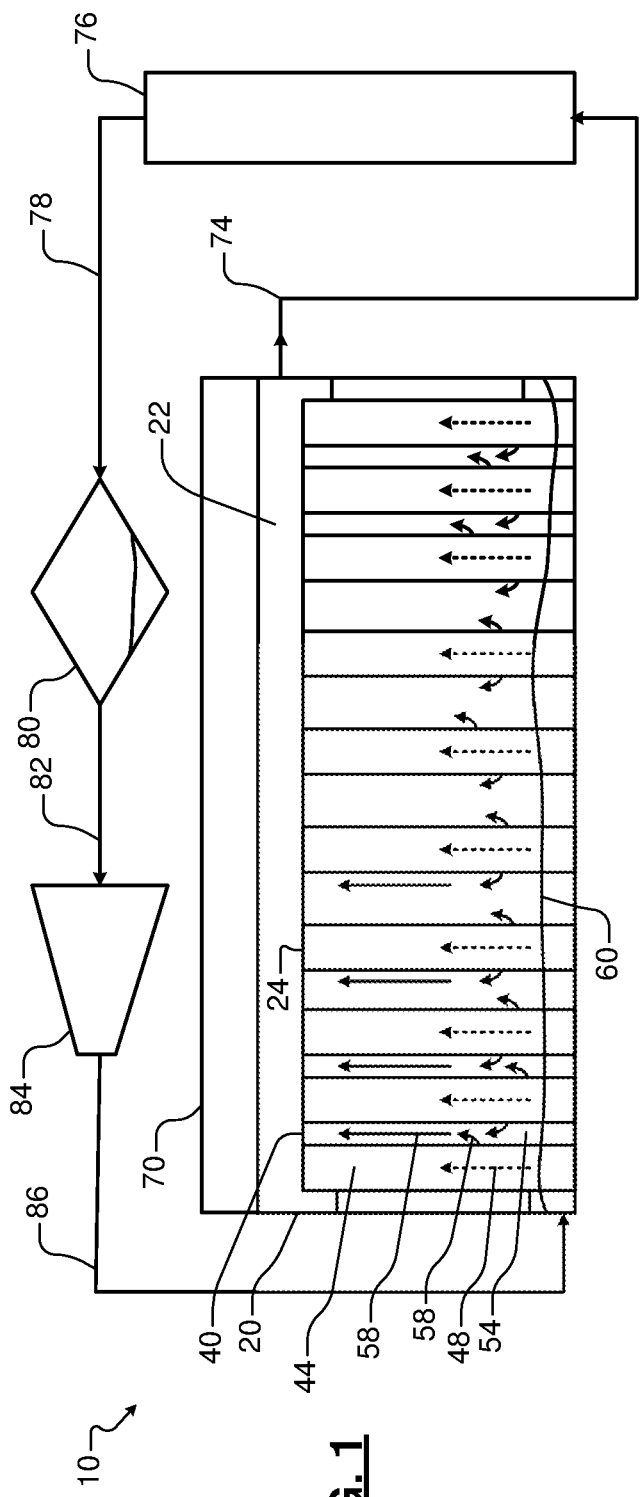
FIG. 1 is a functional block diagram of an example of a battery cooling system including a battery enclosure and wicking assemblies arranged between adjacent battery cells according to the present disclosure.

Referring now to FIG. 1, a battery cooling system 10 is shown to include a battery enclosure 20 housing a plurality of battery cells 24. In some examples, the battery cells 24 comprise pouch-type battery cells that are generally rectangular and arranged lengthwise in a horizontal direction. The pouch-type battery cells have a non-rigid outer surface and are generally compressed in the battery enclosure. In other examples, the battery cells other battery cell formats such as cylindical, prismatic or other formats.

In FIG. 1, a cross-section of a wicking material of a wicking assembly 40 arranged between two battery cells 24 is shown to show pumping of the dielectric fluid along outer surfaces of the battery cells due to capillary action and evaporation of the dielectric fluid into vapor channels.

A vapor manifold 22 is located above the plurality of battery cells 24 to collect vapor exiting the vapor channels. The wicking assembly 40 includes wicking material 44 that wicks dielectric fluid 60 upwardly in FIG. 1 along outer surfaces of the battery cells 24. In some examples, the wicking material includes a wire mesh or a porous structure. In some examples, the wicking material is made of copper, aluminum, nickel, ceramic, stainless steel, or other suitable material.

As the dielectric fluid moves upwardly by capillary action of the wicking material 44 (as shown by arrows 48), heat from the battery cells 24 is absorbed by the dielectric fluid the dielectric fluid 60 causing evaporation. The vapor moves through vapor channels 54 (as shown by arrows 58) that are arranged between the wicking material 44 into the vapor manifold 22.

The vaporized dielectric (arrows 58) flows upwardly into the vapor manifold 22. In some examples, a heat exchanger 70 may be arranged above the vapor manifold 22 to provide additional cooling or an in-situ condensation. In some examples, the heat exchanger 70 is an air-based heat exchanger or liquid-based heat exchanger.

The vapor flows through conduit 74 to an inlet of a condenser 76 where the dielectric vapor is condensed back into dielectric fluid. In some examples, the condenser 76 may include a fan (not shown) to provide additional airflow. The dielectric fluid flows from an outlet of the condenser 76 through a conduit 78 to an inlet of a separator 80. The separator 80 can be used to separate water or other impurities from the dielectric fluid.

An outlet of the separator 80 is connected by a conduit 82 to an inlet of a pump 84. In some examples, $\Delta p_c + \Delta p_{pump} > \Delta p_v + \Delta p_l + p_l g h$ where $\Delta p_c$ corresponds to change in pressure due to capillary action, $\Delta p_{pump}$ corresponds to the change in pressure of the pump, $\Delta p_v$ is the vapor pressure, $\Delta p_l$ is the liquid pressure, g is gravity and h is the height of the battery enclosure.

An outlet of the pump 84 supplies the dielectric fluid via a conduit 86 to an inlet located on a bottom portion of the battery enclosure 20. The placement and geometry of the wicks and vapor passages are tailored based on the heat distribution of a given battery cell to provide efficient cooling. In some examples, the dielectric fluid is selected from a group consisting of 3M Novec 7000 or 7200, Chemours Vertrel XF or modified hydrocarbon-based dielectric fluids, although other dielectric fluids can be used.

Referring now to FIG. 2, a cross-sectional view of the battery enclosure 20 is shown. The battery enclosure 20 houses a plurality of battery cells 24-1, 24-2, ..., 24-N that are arranged adjacent to one another. Wicking assemblies 40-1, 40-2, ..., 40-M are arranged between adjacent pairs of the battery cells 24-1, 24-2, ..., 24-N. In some examples, the wicking assemblies 40-1, 40-2, ..., 40-M have a side cross-section that is approximately the same as the plurality of battery cells 24-1, 24-2, ..., 24-N.

Referring now to FIG. 3, the wicking assembly 40 includes a first face plate 110 and a second face plate 112 that sandwich a wicking structure 114 located there between. The first and second face plates 110 and 112 and the wicking structure 114 are designed to work with the applied horizontal compression used for pouch-type battery cells.

In some examples, the first face plate 110 and the second face plate 112 include vertical plate portions 120 that are spaced apart in a horizontal direction. Horizontal plate portions 122 extend between the vertical plate portions 120 and are also spaced apart in a vertical direction. Openings 124 are defined between the vertical plate portions 120 and the horizontal plate portions 122 of the first face plate 110 and the second face plate 112.

The wicking structure 114 is made of a wicking material. In some examples, the wicking material includes a wire mesh or a porous structure. In some examples, the wicking material is made of copper, aluminum, nickel, ceramic, stainless steel, or other suitable wicking material. The wicking structure 114 includes outer surfaces defining projections 134. The projections 134 extend outwardly and are received by the openings 124 in the first face plate 110 and the second face plate 112 when the wicking assembly 40 is assembled. In some examples, the openings 124 and the projections 134 are generally rectangular, although other shapes can be used.

The wicking structure 114 also defines vapor escape channels 142 that extend vertically at spaced horizontal locations. In some examples, P of the projections 134 are aligned with locations of the vapor escape channels 142, where P is an integer greater than one. In some examples, V vapor escape channels are used where V is an integer greater than one. In some examples, there are (V×P) projections on each side of the wicking structure 114. The interleaved arrangement of the projections 134 and the openings 124 in the first and second face plates 110 and 112 prevents the vapor escape channels 142 from collapsing when compressed between the pouch-type battery cells.

Figure 4:
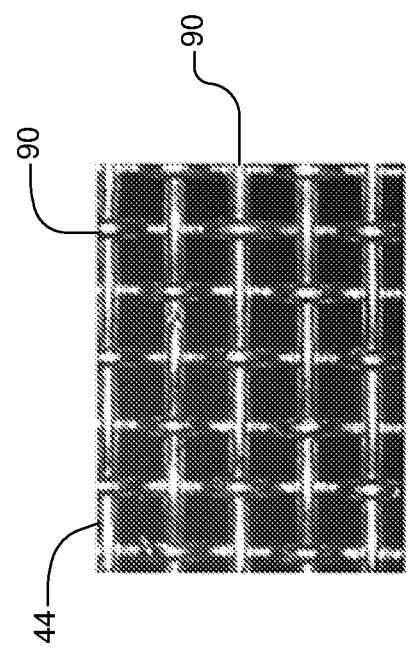
FIG. 4 is an example of a wicking material forming part of the wicking structure according to the present disclosure.

Referring now to FIGS. 3 and 4, an example of the wicking material is shown further. In some examples, the wicking structure 114 is made of a wire mesh, although other types of wicking materials can be used. In FIG. 4, the wire mesh material including wires 90 that are interwoven to form the wire mesh. In some examples, the wicking structure 114 includes a first portion 150 and a second portion 152 having the same shape. In some examples, the first portion 150 and the second portion 152 of the wicking structure are stamped into the wire mesh, although other methods can be used.

The first portion 150 is mirrored relative to the second portion 152 and attached to the second portion 152 with the projections 134 facing outwardly. In some examples, the first and second face plates 110 and 112 are made of a relatively rigid material. For example, the first and second face plates 110 and 112 can be made of material selected from a group consisting of mica, garolite, and aerogel, although other materials can be used.

Figure 5:
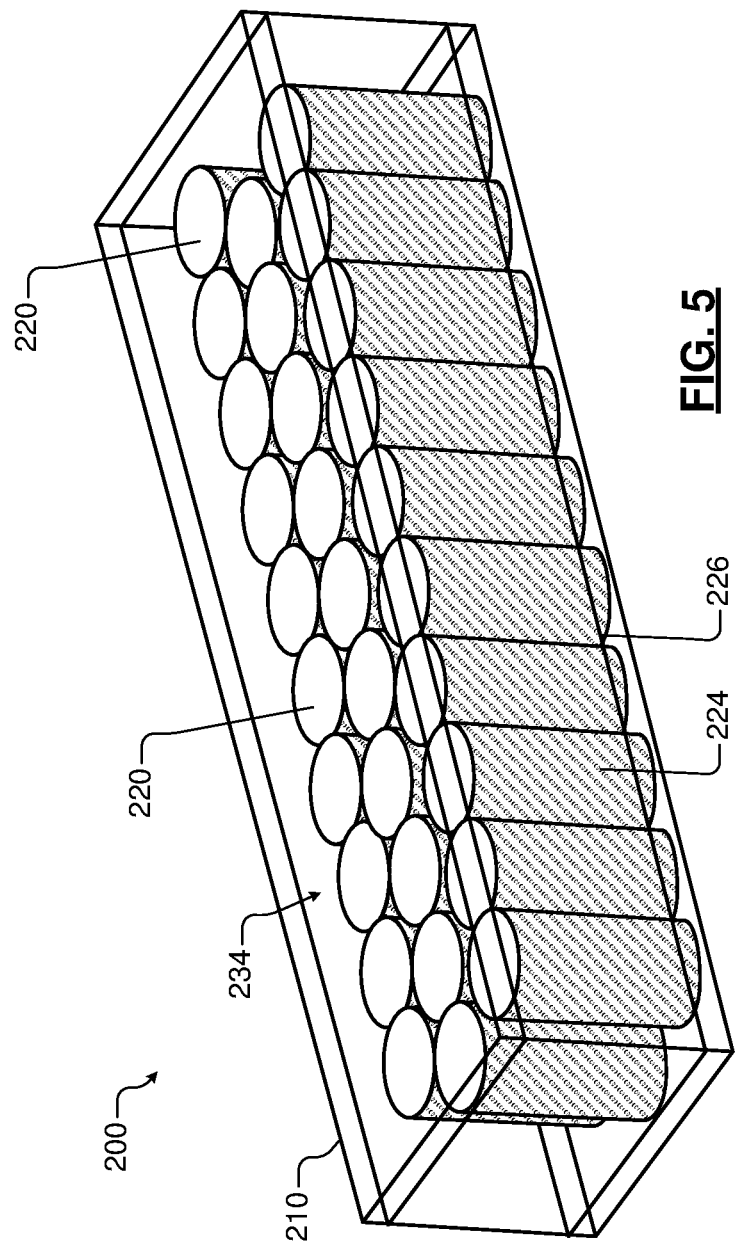
FIG. 5 is a perspective view illustrating a battery enclosure including battery cells with rigid side surfaces and a wicking material arranged around the rigid side surfaces of the battery cells.

Referring now to FIG. 5, another battery cooling system 200 is shown to include a battery enclosure 210 including a plurality of battery cells 220. The battery cells can include various battery cell formats such as pouch, cylindrical, prismatic or other formats. In some examples, the battery cells include rigid outer surfaces (as compared to the pouch-type cells). For example, the plurality of battery cells 220 can have cylindrical or rectangular outer surfaces, although other shapes can be used. The plurality of battery cells 220 are arranged adjacent to one another in the battery enclosure 210. A wicking material 224 is arranged around outer side surfaces of the plurality of battery cells 220. In some examples, the wicking material 224 includes a wire mesh or a porous structure. In some examples, the wicking material is made of copper, aluminum, nickel, ceramic, stainless steel, or other suitable material.

Dielectric fluid 226 is located in a lower portion of the battery enclosure 210. The wicking material 224 arranged on outer surfaces of the plurality of battery cells 220 wicks the dielectric fluid 226 upwardly against the outer surfaces of the plurality of battery cells 220 by capillary action. Heat from the plurality of battery cells 220 causes the dielectric fluid to evaporate. Vapor is collected in a vapor manifold 234, condensed and returned to the battery enclosure 210 as described above. In some examples, the battery cooling system 200 is connected as shown in FIG. 1.

The battery cooling system according to the present disclosure provides evaporative cooling with dielectric liquid on battery cell surfaces. The battery cooling system combines evaporative cooling with dielectric liquid and external circuits for battery cooling. The wicking assembly includes wick structures, such as thin screens, to move dielectric coolant upwards along outer surfaces of the battery cells. The wicking assembly includes wick structures, such as thin screens, with additional pump assistance, to move dielectric coolant in the cooling circuit. The shape, size, and location of wicks are tailored to address uneven heat distribution of a battery cell and improve temperature uniformity. The wicking assemblies provide combined cooling and compression functions for pouch-type battery cells.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A wicking assembly for battery cells of a battery cooling system, comprising:

a first face plate including vertical plate portions and horizontal plate portions defining openings;
a second face plate including vertical plate portions and horizontal plate portions defining openings; and
a wicking structure made of a wicking material, defining projections on first and second outer surfaces thereof and including a plurality of vapor escape passages,
wherein the wicking structure sandwiched between the first face plate and the second face plate.

2. The wicking assembly of claim 1, wherein the projections on the first and second outer surfaces of the wicking structure are received in the openings of the first face plate and the second face plate, respectively.

3. The wicking assembly of claim 1, wherein the projections on the first outer surface and the second outer surface are aligned vertically the plurality of vapor escape passages.

4. The wicking assembly of claim 1, wherein the plurality of vapor escape passages extend in a vertical direction of the wicking structure.

5. The wicking assembly of claim 1, wherein the wicking structure is selected from a group consisting of wire mesh and a porous material.

6. The wicking assembly of claim 1, wherein the first and second face plates are made of a material selected from a group consisting of mica, garolite, and aerogel.

7. A battery cooling system comprising:
a battery enclosure;
M of the wicking assembly of claim 1, wherein M is an integer greater than one; and
N battery cells, where N is an integer greater than one,
wherein each of the M wicking assemblies is arranged between adjacent ones of the N battery cells.

8. The battery cooling system of claim 7, further comprising:
a vapor manifold defined by the battery enclosure above the N battery cells;
a condenser in fluid communication with the vapor manifold; and
a pump including an inlet in fluid communication with the condenser and an outlet in fluid communication with an inlet of the battery enclosure.

9. The battery cooling system of claim 8, further comprising a separator arranged in fluid communication between the condenser and the pump.

10. The battery cooling system of claim 8, further comprising a heat exchanger arranged above the vapor manifold of the battery enclosure.

11. A battery cooling system comprising:
a battery enclosure;
M wicking assemblies, where M is an integer greater than one,
wherein each of the M wicking assemblies includes a first face plate, a second face plate and a wicking structure arranged between the first face plate and the second face plate; and
N battery cells, where N is an integer greater than one,
wherein the N battery cells comprise pouch-type battery cells, and
wherein each of the M wicking assemblies is arranged between adjacent ones of the N battery cells in the battery enclosure.

12. The battery cooling system of claim 11, wherein:
the first face plate includes vertical plate portions and horizontal plate portions defining openings;
the second face plate includes vertical plate portions and horizontal plate portions defining openings;
the wicking structure is made of a wicking material, defines projections on first and second outer surfaces thereof and includes a plurality of vapor escape passages;
the projections on the first and second outer surfaces of the wicking structure are received in the openings of the first face plate and the second face plate, respectively; and
the projections on the first outer surface and the second outer surface are vertically aligned with the plurality of vapor escape passages.

13. The battery cooling system of claim 12, wherein the plurality of vapor escape passages extend in a vertical direction of the wicking structure.

14. The battery cooling system of claim 11, wherein the wicking structure is selected from a group consisting of wire mesh and a porous material.

15. The battery cooling system of claim 11, wherein the first face plate and the second face plate are made of a material selected from a group consisting of mica, garolite, and aerogel.

16. The battery cooling system of claim 11, further comprising:
a vapor manifold defined by the battery enclosure above the N battery cells;
a condenser in fluid communication with the vapor manifold; and
a pump including an inlet in fluid communication with the condenser and an outlet in fluid communication with an inlet of the battery enclosure.

17. The battery cooling system of claim 16, further comprising a separator arranged in fluid communication between the condenser and the pump.

18. The battery cooling system of claim 16, further comprising a heat exchanger arranged above the vapor manifold of the battery enclosure.

19. A battery cooling system comprising:
a battery enclosure;
M wicking assemblies, where M is an integer greater than one, wherein each of the M wicking assemblies includes a first face plate having vertical plate portions and horizontal plate portions defining openings, a second face plate having vertical plate portions and horizontal plate portions defining openings, and a wicking structure, wherein the wicking structure is made of a wicking material, defines projections on first and second outer surfaces thereof and includes a plurality of vapor escape passages, wherein the wicking structure is sandwiched between the first face plate and the second face plate, and wherein the wicking material -is selected from a group consisting of wire mesh and a porous material;
N battery cells arranged in the battery enclosure and having a rigid outer surface, where N is an integer greater than one, wherein each of the M wicking assemblies is arranged between adjacent ones of the N battery cells in the battery enclosure;
a vapor manifold defined by the battery enclosure above the N battery cells;
a condenser in fluid communication with the vapor manifold; and
a pump including an inlet in fluid communication with the condenser and an outlet in fluid communication with an inlet of the battery enclosure.

20. The battery cooling system of claim 19, further comprising:

a separator arranged in fluid communication between the condenser and the pump; and a heat exchanger arranged above the vapor manifold of the battery enclosure.

* * * * *